United States Patent [19]

Wyman

[11] Patent Number: 4,950,065
[45] Date of Patent: Aug. 21, 1990

[54] SHOWER MIRROR

[76] Inventor: Lawrence W. Wyman, 4225 Forest Beach Dr., NW., Gig Harbor, Wash. 98335

[21] Appl. No.: 287,475
[22] Filed: Dec. 19, 1988
[51] Int. Cl.⁵ .......................... G02B 7/18; G02B 5/08
[52] U.S. Cl. .................................. 350/631; 350/606; 248/467
[58] Field of Search ............... 350/588, 631, 606; 248/467, 466, 470, 537

[56] References Cited

U.S. PATENT DOCUMENTS

| | | | |
|---|---|---|---|
| 948,113 | 2/1910 | Moore | 248/467 |
| 4,073,462 | 2/1978 | Whitaker | 248/537 |
| 4,327,961 | 5/1982 | Kladitis | 350/588 |
| 4,529,278 | 8/1983 | Nugent | 248/467 |
| 4,655,559 | 4/1987 | Odell | 248/467 |

Primary Examiner—Rodney B. Bovernick
Assistant Examiner—Tho V. Tran
Attorney, Agent, or Firm—Graybeal, Jensen & Puntigam

[57] ABSTRACT

The article comprises a mirror element (10) and a hanger/support element (14). The hanger (14) includes a flat, flexible base member (16) having a plurality of integral suction cups (22) extending from one surface thereof and a mushroom-shaped projection (20) extending from the opposing surface thereof. The projection (20) is configured to removably fit through an opening (12) in the mirror. Thus, the hanger (14) removably secures the mirror (10) directly to a shower wall or the like and is also removable relative to the mirror (10) itself.

8 Claims, 2 Drawing Sheets

SHOWER MIRROR

DESCRIPTION

1. Technical Field

This invention generally concerns a shower mirror and more particularly concerns a shower mirror which is capable of being hung on a shower wall.

2. Background Art

Many men prefer to shave while taking a shower, which can be difficult without the aid of a mirror. It is therefor a basic object of the present invention to provide a shower mirror which is practical and conveniently portable. A mirror made of glass has several potential problems, including weight and fragility. Another significant problem encountered when one tries to hang a mirror in a shower is the typical lack of any means of support for the mirror. The current alternatives are to use the showerhead for support or to place a permanent support on the shower wall. An additional problem is that many existing mirrors suitable for shaving and the like are not portable, so they cannot be used in showers during travel. Very few, if any, hotels/motels have mirrors in their showers for shaving. The same problem exists at campgrounds and the like.

DISCLOSURE OF THE INVENTION

Accordingly, the present invention is a portable mirror which includes a mirror element and a hanger means for removably securing the mirror element directly to a wall. The hanger means includes means for removably securing the hanger means itself to the mirror element.

BEST MODE FOR CARRYING OUT THE INVENTION

Figure 1:
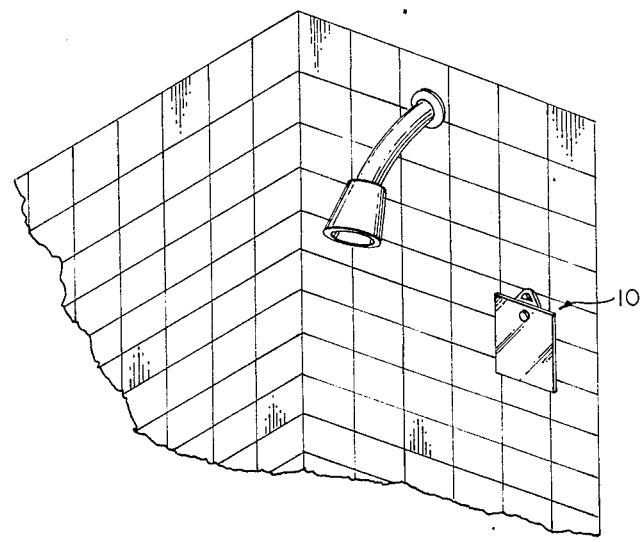
FIG. 1 is a perspective view of the invention shown in place on a shower wall.

Generally, the present invention is a combination of a lightweight, unbreakable mirror and a removable support element for hanging the mirror on a shower wall, as shown generally in FIG. 1. The support element can be attached to any smooth or moderately textured shower wall at substantially any desired location.

Figure 2:
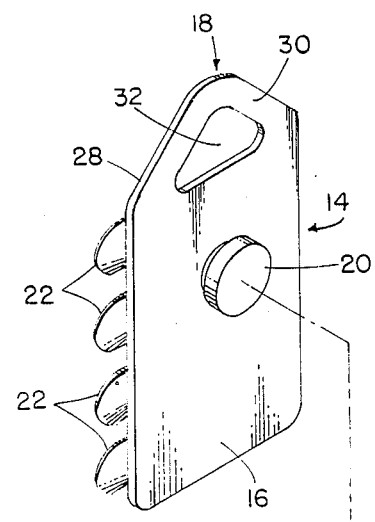
FIG. 2 is an exploded isometric view of the present invention.
Figure 2:
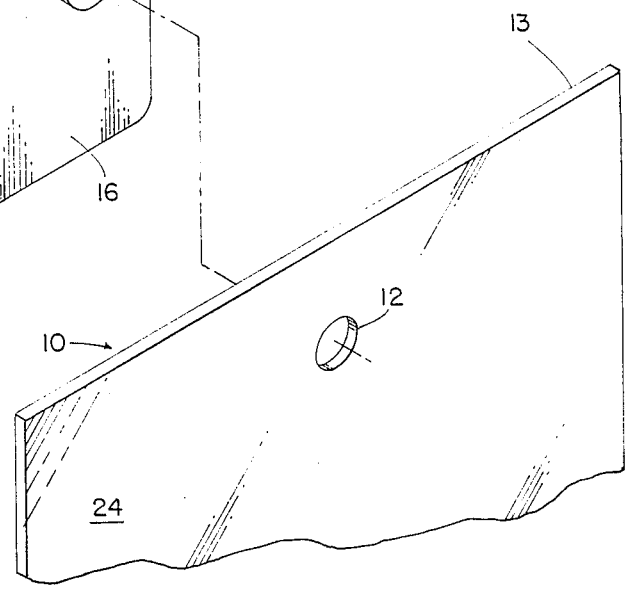
Figure 3:
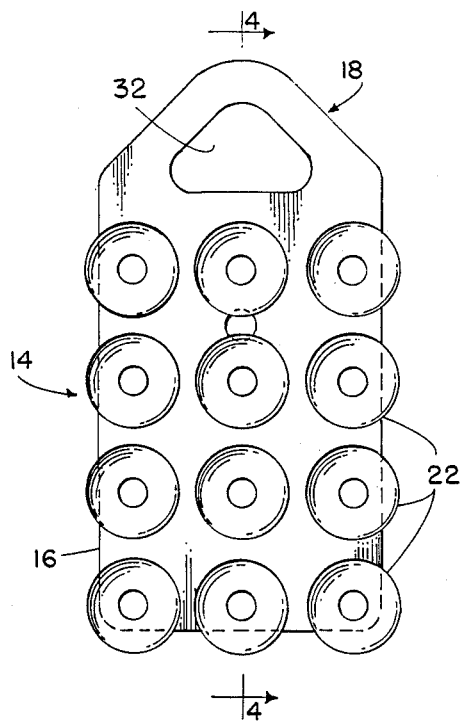
FIG. 3 is a back elevation view of the hanger portion of the present invention.

As can be seen in FIGS. 2 and 3, the present invention includes a mirror 10 with an opening 12 near the top edge 13 which receives a support element 14. Support element 14 includes a rectangular base portion 16 having a loop 18 extending from one end thereof, a button or mushroom-like projection 20 on the front side thereof for connecting the support element 14 to the mirror 10, and a plurality of suction cups 22—22 on the back side thereof for connecting the support element 14 and hence the mirror 10 to a shower wall. The loop 18 can be used to attach the support element 14 to a hook or other such device permanently attached to the shower wall. The suction cups 22—22 allow the user to position the mirror 10 at a selected location on the shower wall and permit the mirror to be conveniently removed from the shower wall in order to clean the wall or to take the mirror to another location.

The mirror 10 of the present invention is sized so as to be easily used for the purpose of shaving while being small enough to be lightweight and easily portable. The mirror 10 in the embodiment shown is 4½ inches wide and 5¾ inches high. The mirror 10 comprises a reflective surface 24 applied to a lightweight, unbreakable backing material, such as plastic. The reflective characteristics of the mirror during showering may be maintained by using any number of commercially available defogging means such as special materials or coatings that are applied to the surface of the mirror, or by simply applying soapy water to the mirror and then rinsing it off.

As shown in FIGS. 2 and 3, the mirror 10 includes a small opening 12 near one edge thereof. Typically the opening 12 is located along one of the short sides of a rectangular shaped mirror 10, i.e. the top side, as shown in FIG. 2.

Figure 4:
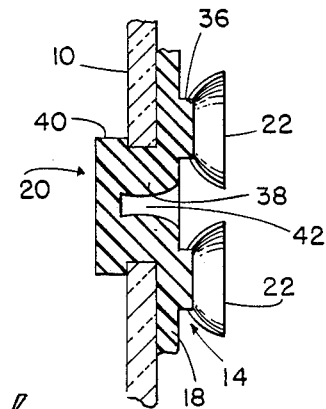
FIG. 4 is a sectional side view of the present invention, taken along lines 4—4 in FIG. 3, showing the relationship between the mirror and hanger portions thereof.

FIGS. 2-4 show the removable support element or hanger of the present invention, generally at 14. The removable support element 14 includes a rectangular base portion 16. The base portion 16 is typically 2½ inches on the long edge and 1¼ inches on the short edge and is molded of a pliable and flexible material such as natural rubber or any similar man-made polymer. The material should be highly flexible, strong, such as Santoprene TM by Monsanto or Kraton TM made by Shell Oil Co. In the embodiment shown, the durometer of the material is 65. A loop 18 is integrally molded with the base portion 16 and extends from one end thereof, substantially an extension of base portion 16. It is typically molded to the short end of the rectangular base portion 16 nearest the button projection 20. The loop 14 is formed by two straight legs 28 and 30 which angle toward each other from the opposing corners of one end of base portion 16 and join to form the continuous loop. The opening 32 bounded by the loop 18 is triangular. The legs 28 and 30 are approximately 3/16 inches wide. The areas where legs 28 and 30 intersect each other and base 16 are rounded.

As shown in FIGS. 2 and 4, the button 20, in the shape of a mushroom, fits through the opening 12 in the mirror 10 by deforming the cap portion 40 of the button 20 and forcing it through the opening 12. The cap then expands back to its normal shape, thereby in effect securing the support element 14 to the mirror 10.

As shown particularly in FIG. 3 and as mentioned above, the rectangular base 16 of the support element 14 has an array of suction cups 22—22 arranged in an orderly fashion on the back surface 17 thereof. The concave-shaped suction cups 22—22 are arranged in the embodiment shown with their centers ½ inches apart. The number and arrangement of the suction cups 22—22 are not critical; however, the holding power of the support element 14 is directly proportional to the number of suction cups. Each of the suction cups 22—22 in the embodiment shown has an outer diameter of 0.395 inches and a spherical radius of 0.281 inches. The suction cups 22—22 include a short post 36 which is 0.213 inches in diameter and is integrally molded with base 14. The overall size and proportions of the suction cups 22—22 can be changed without substantially affecting the holding power of the support element 14.

As shown in FIG. 4, the mushroom-shaped projection or button 20 is 0.455 inches in diameter at the outermost edge of cap portion 40, the cap portion being slightly tapered. The stem portion 38 has a diameter approximately equal to the diameter of opening 12 in the mirror 10. The cap portion 40 has a thickness of 0.090 inches, while the stem portion 38 rises 0.081 inches from the surface of the base 16. The mushroom-shaped projection 20 has a hollow core 42 that is 0.190 inches deep and has a diameter at the rear surface 17 of base 16 of 0.230 inches. The wall defining core 42 tapers inwardly from the rear surface 17 over the length of the stem 38.

The removable support element 14 will secure the mirror 10 to any smooth or moderately textured vertical surface, whether wet or dry. The suction cups 22—22 of the support element 14 will not harm any surface they are attached to and are easily removable to enable the article to be taken and used anywhere that the user desires. The loop 18 serves as an alternative or cumulative means of securing support element 14 to a wall.

Although a preferred embodiment of the invention has been disclosed herein for illustration, it should be understood that various changes, modifications and substitutions may be incorporated in such embodiment without departing from the spirit of the invention as defined by the claims which follow.

I claim:

1. A portable mirror comprising:
   a mirror element;
   hanger means for removably securing the mirror element to a wall, said hanger means including means for removably securing said hanger means to said mirror element, said hanger means including a base element having a plurality of suction cups extending therefrom and a loop for securing said hanger means to a hook or the like mounted on the wall.

2. An article of manufacture for use as a shower mirror comprising:
   a mirror with an opening therethrough located near one edge;
   a hanger means for said mirror, the hanger means including means for removably connecting said hanger means to said mirror and further includes means for removably securing said hanger means directly to a shower wall; and
   means for attaching said hanger means to a hook or the like secured to the shower wall.

3. The article of claim 2, wherein said means directly connecting the hanger to the shower wall includes a flat, relatively thin, flexible base member and a plurality of pliable concave-shaped suction cups integrally formed with and extending from one surface of said base member.

4. The article of claim 3, wherein said means for removably connecting said hanger means to said mirror is a mushroom shaped projection of pliable material integrally formed with the flexible base member and extending from the opposite surface of the base member from said one surface, the projection being sized such that a cap portion thereof is larger than said opening in the mirror and is sufficiently deformable to fit through said opening.

5. The article of claim 3, wherein said attaching means comprises a loop formed integrally with, and extending from one end of, said flexible base member.

6. A portable mirror, comprising:
   a mirror element; hanger means for removably securing the mirror element to a wall, said hanger means including a flat, relatively thin, base element, said base element including a tab-like element which extends therefrom beyond the edge of the mirror element when the mirror element is secured to the wall by said hanger means, said hanger means further including at least one suction cup extending from one side of said base element, and a connecting element extending from the opposing side of said base element, said connecting element being adapted to be received by the mirror element in such a manner that the hanger means is conveniently removable from the mirror.

7. An article of claim 6, wherein the mirror element includes an opening therethrough for receiving the connecting element of the hanger means.

8. An article of claim 6, wherein the tab element is in the form of a loop which permits the hanger means and, hence, the mirror, to be mounted on a hook or the like.

* * * * *